United States Patent
Liu et al.

(10) Patent No.: US 9,453,942 B2
(45) Date of Patent: Sep. 27, 2016

(54) INVERSE OPAL STRUCTURES AND METHODS FOR THEIR PREPARATION AND USE

(75) Inventors: Xiangyang Liu, Botannia (SG); Yingying Diao, Singapore (SG)

(73) Assignee: National University of Singapore, Singapore (SG)

( * ) Notice: Subject to any disclaimer, the term of this patent is extended or adjusted under 35 U.S.C. 154(b) by 948 days.

(21) Appl. No.: 13/492,011

(22) Filed: Jun. 8, 2012

(65) Prior Publication Data

US 2013/0329281 A1 Dec. 12, 2013

(51) Int. Cl.
 G02B 1/00 (2006.01)
 G02B 5/26 (2006.01)
 B82Y 20/00 (2011.01)

(52) U.S. Cl.
 CPC ............... *G02B 1/00* (2013.01); *G02B 1/005* (2013.01); *G02B 5/26* (2013.01); *B82Y 20/00* (2013.01); *G02F 2202/32* (2013.01)

(58) Field of Classification Search
 CPC .............. B82Y 20/00; G02F 2202/32; G02B 6/02295; G02B 6/02309; G02B 1/005; G02B 1/00; G02B 5/26
 See application file for complete search history.

(56) References Cited

U.S. PATENT DOCUMENTS

| | | | |
|---|---|---|---|
| 2,070,243 | A | 2/1937 | Stern |
| 6,037,280 | A | 3/2000 | Edwards et al. |
| 6,261,469 | B1 | 7/2001 | Zakhidov et al. |
| 6,409,907 | B1 | 6/2002 | Braun et al. |
| 6,756,115 | B2 | 6/2004 | Fu et al. |
| 6,939,362 | B2 | 9/2005 | Boyle et al. |
| 7,045,195 | B2 | 5/2006 | Ozin et al. |
| 7,221,512 | B2 * | 5/2007 | Steenblik et al. ............ 359/569 |
| 7,247,349 | B2 | 7/2007 | Ozin et al. |
| 7,527,829 | B2 | 5/2009 | Yoshida et al. |
| 7,616,376 | B2 | 11/2009 | Arsenault et al. |
| 7,758,919 | B2 | 7/2010 | Ozin et al. |
| 8,669,325 | B1 * | 3/2014 | Hyman ..................... B44F 1/00 257/40 |
| 8,921,473 | B1 * | 12/2014 | Hyman ..................... C08K 3/04 423/445 R |
| 2002/0045030 | A1 | 4/2002 | Ozin et al. |
| 2002/0143873 | A1 | 10/2002 | Lamp |
| 2003/0100917 | A1 | 5/2003 | Boyle et al. |
| 2004/0053009 | A1 | 3/2004 | Ozin et al. |
| 2005/0008839 | A1 | 1/2005 | Cramer et al. |
| 2005/0075663 | A1 | 4/2005 | Boyle et al. |
| 2005/0226806 | A1 | 10/2005 | Marlow et al. |
| 2006/0182968 | A1 | 8/2006 | Yoshida et al. |
| 2007/0196571 | A1 | 8/2007 | Ozin et al. |
| 2009/0047352 | A1 | 2/2009 | Butler et al. |
| 2009/0075038 | A1 | 3/2009 | Butler et al. |
| 2009/0133605 | A1 | 5/2009 | Butler et al. |
| 2010/0040741 | A1 | 2/2010 | Butler et al. |
| 2010/0239620 | A1 | 9/2010 | Butler et al. |
| 2010/0298504 | A1 | 11/2010 | Janczewski et al. |
| 2012/0218653 | A1 * | 8/2012 | Liu et al. .................. 359/868 |
| 2013/0075676 | A1 * | 3/2013 | Purdy et al. ............... 252/586 |
| 2014/0334005 | A1 * | 11/2014 | Omenetto et al. .......... 359/577 |

FOREIGN PATENT DOCUMENTS

| | | |
|---|---|---|
| AU | 742112 B2 | 12/2001 |
| AU | 9533301 A | 4/2002 |
| AU | 2002341977 A1 | 6/2003 |
| BR | PI0608708 A2 | 1/2010 |
| CA | 2282402 | 10/1998 |
| CA | 2426105 | 4/2002 |
| CA | 2600356 A1 | 9/2006 |
| CN | 1833184 A | 9/2006 |
| CN | 101175465 A | 5/2008 |
| CN | 101360795 A | 2/2009 |
| CN | 101583674 A | 11/2009 |
| CN | 101754999 A | 6/2010 |
| EP | 0970272 A1 | 1/2000 |
| EP | 1339897 A2 | 9/2003 |
| EP | 1653256 A1 | 5/2006 |
| EP | 1858479 A2 | 11/2007 |
| EP | 1948739 A1 | 7/2008 |
| EP | 2158259 A1 | 3/2010 |
| JP | H09087964 A | 3/1997 |
| JP | 2000233998 A | 8/2000 |
| JP | 2002527335 A | 8/2002 |
| JP | 2004098414 A | 4/2004 |
| JP | 2005060653 A | 3/2005 |
| JP | 2005060654 A | 3/2005 |
| JP | 2005516130 A | 6/2005 |
| JP | 2005516254 A | 6/2005 |
| JP | 2010532738 A | 10/2010 |
| KR | 20060113645 A | 11/2006 |

(Continued)

OTHER PUBLICATIONS

Agnarsson et al., Spider silk as a novel high performance biomimetic muscle driven by humidity, *The Journal of Experimental Biology* (Apr. 15, 2009), 212:1990-1994.

(Continued)

*Primary Examiner* — Derek S Chapel
(74) *Attorney, Agent, or Firm* — Pepper Hamilton LLP

(57) ABSTRACT

Light-reflective structures comprising a binding material configured as an inverse opal having reflections of at least two wavelengths and methods of producing the light-reflective structures are described herein. The wavelengths reflected by the light-reflective structures may be tuned by external stimuli. In an example, silk-fibroin inverse opals have two reflection wavelengths that may be shifted based on changes in humidity.

7 Claims, No Drawings

(56) References Cited

FOREIGN PATENT DOCUMENTS

| RU | 2007138102 A | 4/2009 | | |
|---|---|---|---|---|
| RU | 2008124905 A | 12/2009 | | |
| WO | WO 98/42909 A1 | 10/1998 | | |
| WO | WO 02/33461 A2 | 4/2002 | | |
| WO | WO2005012961 A1 | 2/2005 | | |
| WO | WO2006/097332 A2 | 9/2006 | | |
| WO | WO2007/057146 A1 | 5/2007 | | |
| WO | WO2008/031720 A1 | 3/2008 | | |
| WO | WO2008/141971 A2 | 11/2008 | | |
| WO | WO2008/141973 A1 | 11/2008 | | |
| WO | WO2009/027172 A1 | 3/2009 | | |
| WO | WO2009/038544 A1 | 3/2009 | | |
| WO | WO2009/061823 A1 | 5/2009 | | |
| WO | WO 2011156586 A2 | * | 12/2011 | ......... A61L 27/3604 |
| ZA | 200707903 A | 12/2008 | | |
| ZA | 200803891 A | 9/2009 | | |
| ZA | 200901703 A | 6/2010 | | |

OTHER PUBLICATIONS

Altman et al., Silk-based biomaterials, *Biomaterials* (Jun. 19, 2002), 24:401-416.
Amsden, et al., Spectral Analysis of Induced Color Change on Periodically Nanopatterned Silk Films, *Optics Express* (Nov. 9, 2009), 17(23):21271-21279.
Arsenault et al., A polychromic, fast response metallopolymer gel photonic crystal with solvent and redox tunability: A step towards photonic ink (P-Ink), *Advanced Materials* (Mar. 2003), 15(6):503-507.
Arsenault et al., Photonic-crystal full-colour displays, *Nature Photonics* (Aug. 2007), 1:468-472.
Ashcroft et al., Solid State Physics, Saunders College Publishing (New York, 1976) (TOC).
Banerjee et al., Optical characterization of iridescent wings of *Morpho* butterflies using a high accuracy nonstandard finite-difference time-domain algorithm, *Optical Review* (Jul. 30, 2007), 14(6):359-361.
Berger, Peacock feathers and butterfly wings inspire bio-templated nanotechnology materials, *Nano Werk* (Aug. 15, 2008), www.nanowerk.com/.../spotid=6760.php.
Berthier, Iridescences: The Physical Colours of Insects, *American Entomologist* (2007), 54(3):184-187.
Bogomolov et al., Photonic band gap phenomenon and optical properties of artificial opals, *Physical Review E* (Jun. 1997), 55(6): 76197625.
Briscoe et al., Positive selection of a duplicated UV-sensitive visual pigment coincides with wing pigment evolution in *Heliconius* butterflies, *PNAS* (Feb. 23, 2010), 107(8):3628-3633.
Chen et al., Iridescent large-area $ZrO_2$ photonic crystals using butterfly as templates, *Appl. Phys. Lett.* (Feb. 2, 2009), 94:053901-053903.
Choi et al., Chitosan-Based Inverse Opals: Three-Dimensional Scaffolds with Uniform Pore Structures for Cell Culture, *Adv Mater.* (Apr. 15, 2009), 21(29):2997-3008.
Diao et al., Mysterious colouring: structural origin of colour mixing for two breeds of Papilio butterflies, *Optics Express* (Apr. 26, 2011), 19(10):9232-9241.
Diao et al., Bring Structural Color to Silk Fabrics, *Advanced Materials Research* (2012), 441:183-186.
Diao, Bring Structural Color to Silk Fabrics, Biophysics, Department of Physics, National University of Singapore (Jun. 11, 2010), pp. 1-19.
Du et al., Design of superior spider silk: From nanostructure to mechanical properties, *Biophys J* (Dec. 15, 2006), 91(12):4528-4535.
Economou et al., Classical Wave-Propagation in Periodic Structures—Cermet Versus Network Topology, *Phys Rev B* (1993), 48(18):13434-13438.
Finlayson et al., Ordering in stretch-tunable polymeric opal fibers, *Optics Express* (Feb. 14, 2011), 19(4):3144-3154.
Fudouzi, Tunable structural color in organisms and photonic materials for design of bioinspired materials, *Sci Technol Adv Mater* (Dec. 28, 2011), 12:1-7.
Ge et al., One-step preparation of polystyrene colloidal crystal films with structural colours and high hydrophobicity, *Thin Sold Films* (Dec. 5, 2008), 515(4):1539-1543.
Ge et al., Responsive photonic crystals, *Angewandte Chemie International Edition* (Jan. 20, 2011), 50(7):1492-1522.
Gobin et al., Structural and mechanical characteristics of silk fibroin and chitosan blend scaffolds for tissue regeneration, *Journal of Biomedical Materials Research Part A* (Jun. 27, 2005), 74A(3):465-473.
Gupta et al., A Facile Fabrication Strategy for Patterning Protein Chain Conformation in Silk Materials, *Advanced Materials* (Sep. 3, 2009), 22(1):115-119.
Huang et al., Controlled replication of butterfly wings for achieving tunable photonic properties, *Nano Letters* (2006), 6(10):2325-2331.
Jiang et al., Mechanical properties of robust ultrathin silk fibroin films, *Adv. Funct. Mater.* (2007), 17:2229-2237.
Joannoupoulos et al., Photonic crystals: Molding the flow of light, *Cloth* (1995), p. 184.
Johnson et al., Synthesis and optical properties of opal and inverse opal photonic crystals, *Synthetic Metals* (2001), 116:469-473.
Kim et al., Humidity Sensors Mimicking Cuticle of Hercules Beetles, *IEEE Sensors 2010 Conference* (2010), pp. 805-808.
Kim et al., Structural colour printing using a magnetically tunable and lithographically fixable photonic crystal, *Nature Photonics* (2009), pp. 1-18.
Kinoshita, Structural Colors in the Realm of Nature, World Scientific Publishing Co. Pt. Ltd. (Singapore, 2008).
Kolle et al., Mimicking the colourful wing scale structure of the *Papilio blumei* butterfly, *Nature Nanotechnology* (May 30, 2010), 5:511-515.
Lawrence et al., Bioactive silk protein biomaterial systems for optical devices, *Biomacromolecules* (Mar. 28, 2008), 9(4):1214-1220.
Li et al., Structural origin of the brown colour of barbules in male peacock tail feathers, *Phys. Rev. E* (Jul. 11, 2005), 72(1):010902-010905.
Lim et al., Sex-specific UV and fluorescence signals in jumping spiders, *Science* (Jan. 26, 2007), 315:481.
Liu et al., Structural colour change in longhorn beetles *Tmesisternus isabellae*, *Optics Express* (Aug. 31, 2009), 17(18):16183-16191.
Nakamae et al., Elastic-Modulus of the Crystalline Regions of Silk Fibroin, *Polymer* (Jul. 1989), 30(7):1243-1246.
Omenetto et al. A new route for silk, *Nature Photonics* (2008), 2:641-643.
Perry et al., Nano- and micropatterning of optically transparent, mechanically robust, biocompatible silk fibroin films, *Advanced Materials* (Jul. 7, 2008), 20:3070-3072.
Sah et al., Preparation, characterization and in vitro study of biocompatible fibroin hydrogel, *African Journal of Biotechnology* (Aug. 2, 2011), 10(40):7878-7892.
Schmidt et al., Interference effect pigments—new technologies in cosmetics products, *SOFW Journal* (2010), 136:42-48.
Takeuchi et al., Colour discrimination at the spatial resolution limit in a swallowtail butterfly, *Papilio xuthus, The Journal of Experimental Biology* (2006), 209:2873-2879.
Ultrafast Nonlinear Optics and Biophotonics Laboratory: Structural color and photonic crystals (http://ase.tufts.edu/biomedical/unolab/structural.html [Printed from internet Jun. 24, 2010].
Velev et al., Structured porous materials via colloidal crystal templating: From inorganic oxides to metals, *Advanced Materials* (2000), 12(7):531-534.
Vollrath et al., Liquid crystalline spinning of spider silk, *Nature* (Mar. 29, 2001), 410:541-548.
Vos et al., Higher order Bragg diffraction by strongly photonic *fcc* crystals: onset of a photonic bandgap, *Physics Letters A* (Jul. 17, 2000), 272:101-106.
Vos et al., Strong effects of photonic bands structures on the diffraction of colloidal crystals, *Physical Review B* (Jun. 16, 1996), 53(24):16231-16235.

(56) References Cited

OTHER PUBLICATIONS

Vukusic et al., Structural colour: Colour mixing in wing scales of a butterfly, *Nature* (Mar. 30, 2000), 404:457.

Vukusic et al., Sculpted-multilayer optical effects in two species of Papilio butterfly, *Applied Optics* (2001), 40(7):1116-1125.

Wang et al., Bioinspired Colloidal Photonic Crystals with Controllable Wettability, *Acc. Chem. Res.* (Mar. 14, 2011), 44(6):405-415.

Wang et al., Fabrication of polyaniline inverse opals via templating ordered colloidal assemblies, *Advanced Materials* (Mar. 2001), 13(5):350-354.

Wijnhoven et al., Preparation of photonic crystals made of air spheres in Titania, *Science* (Aug. 7, 1998), 281:802-504.

Xie et al., Controllable Epitaxial Crystallization and Reversible Oriented Patterning of Two-Dimensional Colloidal Crystals, *J Am Chem Soc* (2009), 131: 4976-4982.

Yoshioka et al., Coloration using higher order optical interference in the wing pattern of the Madagascan sunset moth, *J. R. Soc. Interface* (Nov. 13, 2007), 5:457-464.

Zi, et al., Coloration strategies in peacock feathers, *PNAS* (Oct. 28, 2003), 100(22):12567-12578.

Kinoshita et al., Structural colors in nature: The role of regularity and irregularity in the structure, *Chemphyschem* (2005), 6:1442-1459.

Sah et al., Regenerated Silk Fibroin from *B. mori* Silk Cocoon for Tissue Engineering Applications, *International Journal of Environmental Science and Development* (Dec. 2010), 1(5):404-408.

\* cited by examiner

INVERSE OPAL STRUCTURES AND METHODS FOR THEIR PREPARATION AND USE

BACKGROUND

Structural coloration caused by the interaction of light with nanoscale periodic structures, so-called photonic crystals, has attracted considerable attention in a variety of research areas. The potential applications range from decorations to display technologies. Structural color has many characteristics that differ from those of pigments or dyes. The unique colors originating from the physical structures are usually iridescent and metallic, and cannot be obtained by chemical dyes or pigments. Moreover, structural color is brighter, more deeply saturated, free from photo-bleaching, and longer lasting, unlike traditional pigments or dyes.

In the biological world, the colorful feathers of many birds (i.e. peacock), the wings of various butterflies and the elytra of many beetles are good examples of structural coloration. Apart from the aforementioned properties, natural structural colors produced by these animals also give rise to additional optical properties. For instance, the brown barbules of peacock feathers adopt mixed structural coloration; the green wing scales of *Papilio Blumei* produce polarization effect and bi-structural-color reflection. In particular, bi-structural-color reflection is responsible for various crucial functions in the animal kingdom. The widespread evidence indicates that animal photoreceptors can distinguish different parts of the spectrum, even also sensitive to ultraviolet (UV) light. It follows that the bi-structural-color reflection of certain butterflies cover both the visible and UV ranges, which may serve as communication and mating signals. The construction of an effective and simple way to produce multiple-structural-color reflection covering UV, visible and infrared (IR) ranges simultaneously may point to a new direction in multi-functional photonic materials engineering.

Bi-structural-color reflection can be created by different manners in the biological world. Under UV-visible light, the blue wing scales of the butterfly *Papilio Ulysses* display two distinct reflection peaks. Specifically, the concavities of a multi-layer structure and the ridges of a 2D photonic-crystal structure occurring at the wing scales produce green and UV reflections, respectively. On the other hand, the green wing scales of the butterfly *Papilio Blumei* produce the reflections of two different visible colors. The yellow and blue reflections created by the flat bottoms and inclined sides of the concavities, respectively, give rise to a color mixing, leading to a green color as perceived by human eyes. The aforementioned bi-structural-color reflection produced by the two *Papilio* butterflies are of different structural origins: in *P. Ulysses* it is produced by two different types of ordered structures of the wing scales, while in *P. Blumei* it is produced by the different illumination angles from different parts of the wing scales, which share the same ordered nano-structure.

SUMMARY

This disclosure is not limited to the particular systems, devices and methods described, as these may vary. The terminology used in the description is for the purpose of describing the particular versions or embodiments only, and is not intended to limit the scope. While various compositions and methods are described in terms of "comprising" various components or steps (interpreted as meaning "including, but not limited to"), the compositions and methods can also "consist essentially of" or "consist of" the various components and steps, and such terminology should be interpreted as defining essentially closed-member groups.

In an embodiment, a light-reflective structure comprises a binding material configured as an inverse opal, wherein the inverse opal has a crystal lattice with a lattice constant selected to produce reflection of at least two desired wavelengths. In some embodiments, the binding material may be silk-fibroin.

In an embodiment, a method of forming a light-reflective material comprises: assembling a plurality of particles in a crystal lattice on a substrate; applying a binding material to the assembled plurality of particles such that voids at least partially surrounding the particles are at least partially filled with the binding material; and etching the plurality of particles to obtain a light-reflective material, wherein the light-reflective material has a lattice constant selected to produce reflection of at least two desired wavelengths.

DETAILED DESCRIPTION

Herein are described light-reflective structures and methods of producing light-reflective structures. In some embodiments, light-reflective structures with reflections at two different wavelengths (bi-structural-color reflection) may take advantage of the photonic band structure of inverse opals. In these embodiments, the light-reflective structures may have simple processing procedures, and the wavelengths of bi-structural-color reflection may be easily tuned. In some embodiments, the wavelengths of bi-structural-color reflection peaks may be controlled by adjusting the pore size of the inverse opals. In some embodiments, the light-reflective structures may comprise silk-fibroin.

Silk-fibroin has recently emerged as a highly promising biomaterial in various applications (i.e. biomedical industry), owing to its excellent mechanical and optical properties, biocompatibility, biodegradability and implant ability. In addition, silk-fibroin has some special properties, i.e. humidity induced cyclic contraction, which in some embodiments, may be adopted to achieve tunable bi-structural-color reflection by external stimuli. In some embodiments, the continuous tuning of bi-structural-color reflection of a silk-fibroin inverse opal can be achieved by changing the humidity level. In some embodiments, the rapid production of silk-fibroin inverse opals with bi-structural-color reflection in both UV and visible (UV/visible), visible and IR (visible/IR), and UV and IR (UV/IR) ranges may be achieved.

Similar to electron waves in a solid crystal, light propagation in photonic crystals is characterized by a photonic band structure. If refractive-index modulations in photonic crystals are sufficient, a photonic bandgap can open up. For frequencies within this photonic bandgap, light propagation is not allowed. The photonic band structure of an inverse opal may be calculated by known plane wave expansion methods. In some embodiments, it may be observed that a silk-fibroin inverse opal may can produce bi-structural-color reflection.

In some embodiments, the bi-structural-color reflection offered by inverse opals may be adjusted by: i) the positions of the two reflection peaks ($\lambda_1$ and $\lambda_2$) and the separation between them ($\lambda$) can be adjusted by changing the lattice constant (a) since the mid-gap frequencies are inversely proportional to a; ii) once the lattice constant a is given, $\lambda_1$, $\lambda_2$, and $\lambda$ can be adjusted by changing the refractive indices of the constituent materials; iii) if a and constituent materials are given, $\lambda_1$, $\lambda_2$, and $\lambda$ can be changed by varying the illumination angle, similar to the case as indicated for *P. Blumei*. This allows one to design and create a structure that reflects two selected colors or wavelengths. The created structure could be formed on, applied onto, or disposed onto an article to provide protection from the two wavelengths. For example, one could design and create a structure that reflects both visible and IR wavelengths, and form on, apply onto, or dispose it onto an automobile to protect against visible and IR damage from sunlight. The article can generally be any type of article. Non-limiting examples of articles include clothing, vehicles (such as cars, trucks, motorcycles, airplanes, helicopters, boats, bicycles), electronics, computers, televisions, telephones, sporting goods, and so on.

In some embodiments, wherein the light-reflective structure is a silk-fibroin inverse opal: the mid-gap wavelength of the first partial photonic bandgap ($\lambda_1$) may equal about 1.43 a; the second partial photonic bandgap ($\lambda_2$) may equal about 0.69 a; and the separation ($\lambda$) may equal about 0.74 a. As an example, a silk-fibroin inverse opal with visible/IR reflection peaks may be obtained when the first peak ($\lambda_1$=1.43 a) is located within the IR region (greater than about 700 nm) and the second peak ($\lambda_2$=0.69 a) is in the visible region (about 400 nm to about 700 nm). The factors 1.43, 0.69, and 0.74 used in the equations for $\lambda_1$, $\lambda_2$, and $\lambda$ are determined by plane wave expansion methods and may vary depending on the method used and based on index of refraction of the materials. In some embodiments, light-reflective structures may have a lattice constant selected from about 400 nm to about 1050 nm, about 400 nm, about 500 nm, about 600 nm, about 700 nm, about 800 nm, about 900 nm, about 1000 nm, about 1050 nm, or any size or range of sizes between those listed. The lattice constant may be varied, or tuned, by the method used to make the light-reflective structure.

In an exemplary method, colloidal spheres of a desired size may be applied to substrate to form a colloidal crystal template with a face centered cubic structure. A solution of a binding material may be prepared, introduced into the voids of the colloidal crystals, and allowed to dry. The template may be removed by chemical etching to obtain an inverse opal film.

The colloidal spheres may be of any size or composition known in the art, and the examples used herein are not intended to be limiting. The size of the spheres may be selected based on the desired lattice constant and the desired reflection wavelengths. In some embodiments, the size of the spheres may be polydisperse. In other embodiments, the size of the spheres may be monodisperse. The composition of the spheres may be selected to allow selective removal of the template versus the inverse opal.

In some embodiments, the measured lattice constant of an inverse opal may be the same size as the colloidal spheres, may be larger than the colloidal spheres, or may be smaller than the colloidal spheres. The ratio of the lattice constant to the sphere size may vary based on the materials and methods used to produce the inverse opal. In some embodiments, the lattice constant may be about 15% to about 30% larger than the spheres. In some embodiments, the lattice constant may be about 10% to about 40%, about 10% to about 20%, about 10% to about 15%, about 15% to about 20%, about 20% to about 30%, or about 20% to about 40% larger than the spheres.

In a non-limiting example: colloidal crystals may be formed using 350 nm, 450 nm, 500 nm, and 700 nm polystyrene spheres; a silk-fibroin solution may be introduced into the colloidal crystals; the solution may be allowed to dry; and the polystyrene spheres may be etched to provide silk-fibroin inverse opals with lattice constants of about 415 nm, about 560 nm, 620 nm, and 900 nm, respectively. Using lattice constants of about 415 nm, about 560 nm, 620 nm, and 900 nm: the $\lambda_1$ wavelengths are predicted to be about 592 nm, 810 nm, 885 nm, 1285 nm, respectively; and the $\lambda_2$ wavelengths are predicted to be about 284 nm, 383 nm, 424 nm, 616 nm, respectively. The following table summarizes these results.

TABLE 1

| Predicted dual wavelengths | | | |
|---|---|---|---|
| Sphere size | Lattice constant | $\lambda_1$ wavelength | $\lambda_2$ wavelength |
| 350 nm | 415 nm | 592 nm | 284 nm |
| 450 nm | 560 nm | 810 nm | 383 nm |
| 500 nm | 620 nm | 885 nm | 424 nm |
| 700 nm | 900 nm | 1285 nm | 616 nm |

It should be appreciated that colloidal spheres with sizes other than those listed and materials with refractive indices different than silk-fibroin and air may provide different $\lambda_1$ and $\lambda_2$ wavelengths. The $\lambda_1$ and $\lambda_2$ pairs listed herein are not expected to be limiting, as routine experimentation with materials and methods may provide a wide range reflection wavelengths.

In some embodiments, the partial photonic band gaps of the inverse opal are direction-dependent. In some embodiments, the two peaks of the bi-structural-color reflection may undergo a blue shift in wavelength when the incident angle changes from normal to oblique. In some embodiments, as the incident light angle increases, the double reflection peaks may vary approximately as $\lambda_0 \cos \theta$, where $\theta$ is the incident angle and $\lambda_0$ is the peak wavelength under normal incidence.

In some embodiments, the reflection wavelengths of a light-reflective structure may be tuned by external stimuli. In some embodiments, a silk-fibroin inverse opal may expand and contract at different humidity levels. In some examples, a reflection peak of a silk-fibroin inverse opal may be red-shifted at higher humidity and may be blue shifted at lower humidity. In some embodiments, a shift in reflected wavelength due to humidity changes may be reversible.

In an embodiment, a light-reflective structure may comprise a binding material configured as an inverse opal. In these embodiments, the inverse opal may have a crystal lattice with a lattice constant that may be selected to produce reflection of at least two desired wavelengths. In some embodiments, the crystal lattice may have a periodic structure selected from the group consisting of a face-centered cubic structure, a hexagonal close packed structure, a body centered cubic structure, and a simple cubic structure. In some embodiments, each of the at least two desired wavelengths may be selected from at least one ultraviolet light wavelength, at least one visible light wavelength, and at least one infra-red light wavelength. In some embodiments, the structure may further comprise a coating layer at least partially covering the binding material configured as an inverse opal. In some embodiments, a change in humidity may cause a change in the lattice constant.

In some embodiments, the binding material may be a polymer-based or protein-based material. In some embodiments, the binding material may comprise silk-fibroin.

In some embodiments, the structure may further comprise a substrate which may be in contact with the binding material configured as an inverse opal. In some embodiments, the substrate may be a fabric, fiber, or other textile material. In some embodiments, the fabric, fiber, or other textile material may comprise silk, cotton, rayon, polyester, wool, flax, jute, hemp, modal, bamboo, lyocell, asbestos, basalt, glass, aramid, acrylic, nylon, spandex, olefin, polylactide, lurex, casein, other natural or artificial fibers, or any combination thereof.

In an embodiment, a method of forming a light-reflective material comprises: assembling a plurality of particles in a crystal lattice on a substrate; applying a binding material to the assembled plurality of particles such that voids at least partially surrounding the particles are at least partially filled with the binding material; and etching the plurality of particles to obtain a light-reflective material, wherein the light-reflective material may have a lattice constant selected to produce reflection of at least two desired wavelengths. In some embodiments, each of the at least two desired wavelengths may be selected from at least one ultraviolet light wavelength, at least one visible light wavelength, and at least one infra-red light wavelength. In some embodiments, the two desired wavelengths may be selected from the following combinations: a) a visible light wavelength and an infra-red light wavelength; b) a visible light wavelength and an ultraviolet light wavelength; and c) an infra-red light wavelength and an ultraviolet light wavelength. In other embodiments, the two desired wavelengths may be two visible light wavelengths, two infra-red light wavelengths, or two ultraviolet light wavelengths. In some embodiments, the light-reflective material may include the binding material configured as an inverse opal. In some embodiments, the method may further comprise applying a second binding material over the light-reflective structure.

In some embodiments, the substrate may be a fabric, fiber, or other textile material. In some embodiments, the fabric, fiber, or other textile material may comprise silk, cotton, rayon, polyester, wool, flax, jute, hemp, modal, bamboo, lyocell, asbestos, basalt, glass, aramid, acrylic, nylon, spandex, olefin, polylactide, lurex, casein, other natural or artificial fibers, or any combination thereof. In some embodiments, the method may further comprise treating the substrate before the assembling step such that the substrate becomes hydrophilic or more hydrophilic. In some embodiments, treating the substrate may comprise exposing the substrate to ultraviolet light, x-ray radiation, or both.

In some embodiments, assembling the plurality of particles may be based on convective self-assembly. In some embodiments, the crystal lattice may have a periodic structure selected from the group consisting of a face-centered cubic structure, a hexagonal structure, a body centered cubic structure, and a simple cubic structure in three dimensions (3D), or a square structure, a hexagonal structure, and a rectangular structure in two dimensions (2D).

In some embodiments, the plurality of particles are colloidal spheres. In some embodiments, the plurality of particles are selected from the group consisting of polystyrene spheres, biodegradable colloidal spheres, silica colloidal spheres, titania colloidal spheres, and protein colloidal spheres, or any combination thereof. In some embodiments, the particles have a size that may be selected based on the selected lattice constant.

In some embodiments, the method may further comprise removing the light-reflective material from the substrate. In some embodiments, the method may further comprise grinding the light-reflective material or forming a powder of the light-reflective material.

In some embodiments, a system can comprise the light-reflective structure and a humidity control device. The humidity control device can be configured to increase the humidity level at or near the structure, decrease the humidity level at or near the structure, or both. The humidity control device can further comprise a humidity sensor configured to control the operation of the humidity control device in order to achieve a desired humidity level at or near the structure.

EXAMPLES

Example 1

Silk-Fibroin Solution Preparation

Silkworm cocoons were harvested from laboratory fed silkworm *Bombyx mori*. Sericin was removed from the fibroin strands by boiling the cocoons in a 0.5 wt. % aqueous solution of sodium bicarbonate for 45 minutes. Then, the fibroin bundle was rinsed thoroughly in deionized water several times and allowed to dry overnight. The dried silk-fibroin was dissolved in a saturated solution of lithium bromide (9.3 M/L) at 40° C. for 1 hour. The lithium bromide salt was then extracted from the solution through a water-based dialysis cassette for 3 days, and remaining particulates were removed through centrifugation (10000 rpm, 15 minutes). This process produced a 4% w/v silk-fibroin solution with excellent quality and stability. The desired 2% w/v solution was obtained by dilution.

Example 2

Calculation of the Band Structure of Silk-Fibroin Inverse Opals

Numerical simulations were carried out using commercial software (RSoft Design). The first 20 bands were calculated for the first Brillouin zone of the FCC lattice. As a silk-fibroin inverse opal consists of hollow silk-fibroin spheres, the thickness of silk-fibroin shells (d1) was assumed to be 10% with respect to that of air spheres (d2). The refractive index of silk-fibroin was taken as 1.54. There are two partial photonic band gaps in the calculated band structure of the silk-fibroin inverse opal, the mid-gap frequency of the 1st stop gap is at $a/\lambda=0.69$, and that of the 2nd stop gap occurs at $a/\lambda=1.43$.

Example 3

Fabrication of Silk-Fibroin Inverse Opals

Monodispersed polystyrene (PS) latex spheres with different diameters (350 nm, 450 nm, 500 nm and 700 nm) were used as received from the supplier (Duke Scientific). The colloidal suspensions were loaded on silica substrates, and dense colloidal crystals were grown by sedimentation of the spheres. The samples were dried at 40° C. for 2-4 hours. Colloidal crystals were formed with the evaporation of the suspensions. The voids in the colloidal crystals were filled with the 2% w/v solution silk-fibroin from Example 1. The silk-fibroin solution was casted and penetrated into voids of the colloidal crystals by capillary force. The samples were then incubated (25° C., 30% relative humidity) for 5 hours, ensuring the voids in the colloidal crystal were sufficiently filled and allowing the silk-fibroin solution to dry slowly. In the third step of the process, PS spheres were removed by immersing the samples into tetrahydrofuran (THF, received from Fluke) for 4-5 hours. The samples were then taken out to evaporate the THF.

Example 4

Characterization of the Synthesized Colloidal Crystals and Silk-Fibroin Inverse Opals A field emission scanning electron microscope (SEM-JEOL 6700F) was used to characterize the micro-structures and determine the lattice constant of the samples for Example 3. Optical images were taken by Olympus (BX 61), reflectance measurements were carried out by UV-Vis spectrometer (Ocean Optics 2000) and a homemade angle-resolved reflectance spectrometer. These results are summarized in Table 2. The particular instrumentation used prevented the detection of the 1285 nm peak.

TABLE 2

Calculated vs. measured reflections

| Sample | Lattice constant (a) | Calculated mid-gap wavelength | | Measured Reflection peaks |
|---|---|---|---|---|
| | | $\lambda_1 = 1.43a$ | $\lambda_2 = 0.69a$ | |
| 350 nm | 415 nm | 592 nm | 284 nm | 590 nm and 285 nm |
| 450 nm | 560 nm | 810 nm | 383 nm | 800 nm and 380 nm |
| 500 nm | 620 nm | 885 nm | 424 nm | 870 nm and 430 nm |
| 700 nm | 900 nm | 1285 nm | 616 nm | 620 nm |

Example 5

Fabrication of Silk Photonic Crystals on the Surface of Silk Fabrics

A sample of silk fabric was irradiated under UV light for 20 minutes to get a hydrophilic surface. A polystyrene colloidal suspension was then loaded onto the surface of a silk fabric and a colloidal crystal was then self-assembled on the hydrophilic silk fabric surface. The samples were dried at 40° C. for 2-4 hours. Colloidal crystals were formed with the evaporation of the suspensions. Afterwards, silk-fibroin solution (2% w/v) was applied in the voids in the colloidal crystals. The silk-fibroin solution was casted and penetrated into voids of the colloidal crystals by capillary force. The samples were then incubated (25° C., 30% relative humidity) for 5 hours, ensuring the voids in the colloidal crystal were sufficiently filled and allowing the silk-fibroin solution to dry slowly. In the third step of the process, PS spheres were removed by immersing the samples into tetrahydrofuran (THF, received from Fluke) for 4-5 hours. The samples were then taken out to evaporate the THF.

Example 6

Humidity-Based Tuning of Reflectance from Silk-Fibroin Film

The reflectance spectra of the 350 nm silk-fibroin inverse opal from Example 4 was measured with the sample in a custom humidity controlled chamber. When the humidity was alternated between 30% and 80% relative humidity, $\lambda_1$ reversibly switched from 587 nm to 603 nm and $\lambda_2$ reversibly switched from 285 nm to 291 nm. When the humidity was increased from 30% to 80% relative humidity in 10% increments, $\lambda_1$ and $\lambda_2$ increased linearly from 587 nm to 603 nm and from 285 nm to 291 nm. Visually the color changed from orange to yellow.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or an (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or figure, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

What is claimed is:

1. An apparatus including a light-reflective fabric material comprising a binding material configured as an inverse opal, wherein the inverse opal comprises silk fibroin and has a crystal lattice with a lattice constant selected to produce reflection of at least two desired wavelengths,
wherein a change in humidity causes a change in the lattice constant to generate a shift in the at least two desired wavelengths,
wherein the apparatus further comprises a humidity control device configured to vary a humidity level,
further comprising a substrate which is in contact with the binding material configured as an inverse opal, and
wherein the substrate is a fabric, fiber, or other textile material.

2. The apparatus of claim 1, wherein the inverse opal further comprises a polymer-based material.

3. The apparatus of claim 1, wherein the fabric, fiber, or other textile material comprises silk, cotton, rayon, polyester, wool, flax, jute, hemp, modal, bamboo, lyocell, asbestos, basalt, glass, aramid, acrylic, nylon, spandex, olefin, polylactide, lurex, casein, other natural or artificial fibers, or any combination thereof.

4. The apparatus of claim 1, further comprising a coating layer at least partially covering the binding material configured as an inverse opal.

5. The apparatus of claim 1, wherein the crystal lattice has a periodic structure selected from the group consisting of a face-centered cubic structure, a hexagonal close packed structure, a body centered cubic structure, and a simple cubic structure.

6. The apparatus of claim 1, wherein each of the at least two desired wavelengths is selected from at least one ultraviolet light wavelength, at least one visible light wavelength, and at least one infra-red light wavelength.

7. The apparatus of claim 1, wherein the humidity control device further comprises a humidity sensor configured to operate the humidity control device to achieve the humidity level.

* * * * *